United States Patent [19]

Smader

[11] 3,995,840
[45] Dec. 7, 1976

[54] DOUGHMAKER ATTACHMENT FOR KITCHEN MIXER

[75] Inventor: C. Louis Smader, Cheshire, Conn.

[73] Assignee: Scovill Manufacturing Company, Waterbury, Conn.

[22] Filed: June 30, 1975

[21] Appl. No.: 591,496

[52] U.S. Cl. .......................... 259/107; 259/DIG. 14
[51] Int. Cl.² .......................................... B01F 7/16
[58] Field of Search ........... 259/107, 108, DIG. 10, 259/DIG. 14, DIG. 1, 106, 111, 114, 101

[56] References Cited

UNITED STATES PATENTS

| | | | |
|---|---|---|---|
| 841,296 | 1/1907 | Woodruff | 259/DIG. 14 |
| 1,027,960 | 5/1912 | Woodruff | 259/107 |
| 1,548,041 | 8/1925 | Johnston | 259/DIG. 10 |
| 1,548,919 | 8/1925 | Ward | 259/DIG. 10 |
| 1,884,120 | 10/1932 | Mross | 259/107 |
| 2,687,284 | 8/1954 | Gerber | 259/108 |
| 2,896,924 | 7/1959 | Jepson | 259/108 |
| 3,318,583 | 5/1967 | Wright | 259/108 |

FOREIGN PATENTS OR APPLICATIONS

| | | | |
|---|---|---|---|
| 208,383 | 12/1955 | Australia | 259/108 |

*Primary Examiner*—Harry N. Haroian
*Attorney, Agent, or Firm*—Dallett Hoopes

[57] ABSTRACT

The invention comprises dough-hook and speed-reducing means for ordinary stand mixer to drive dough hook. Dough hook has downward stud on the bottom thereof and mixer pedestal has anti-rotation brake, the stud and brake comprising bowl-immobilizing means for mixing heavy dough.

3 Claims, 10 Drawing Figures

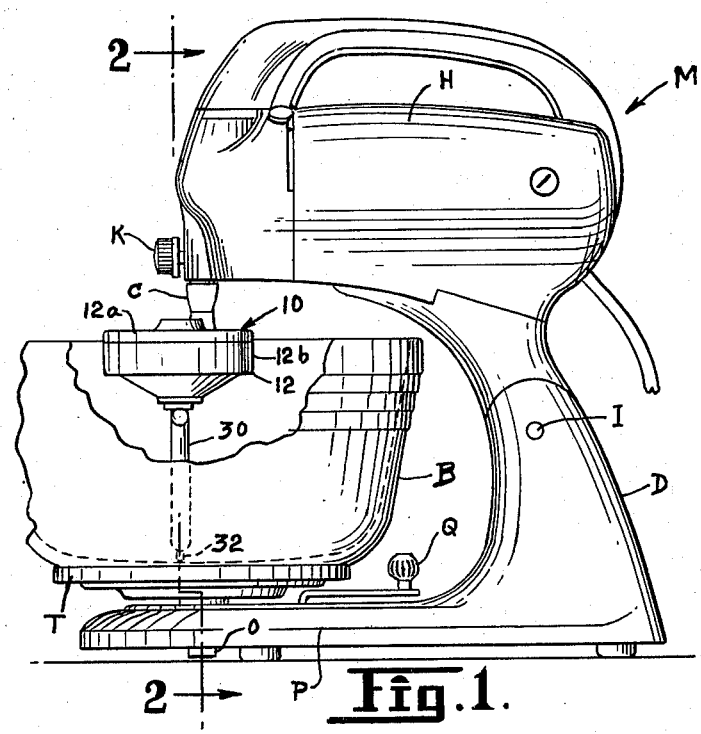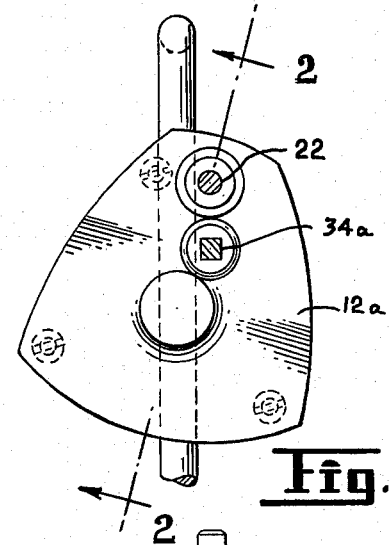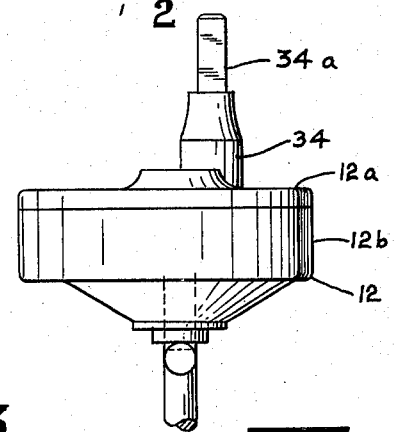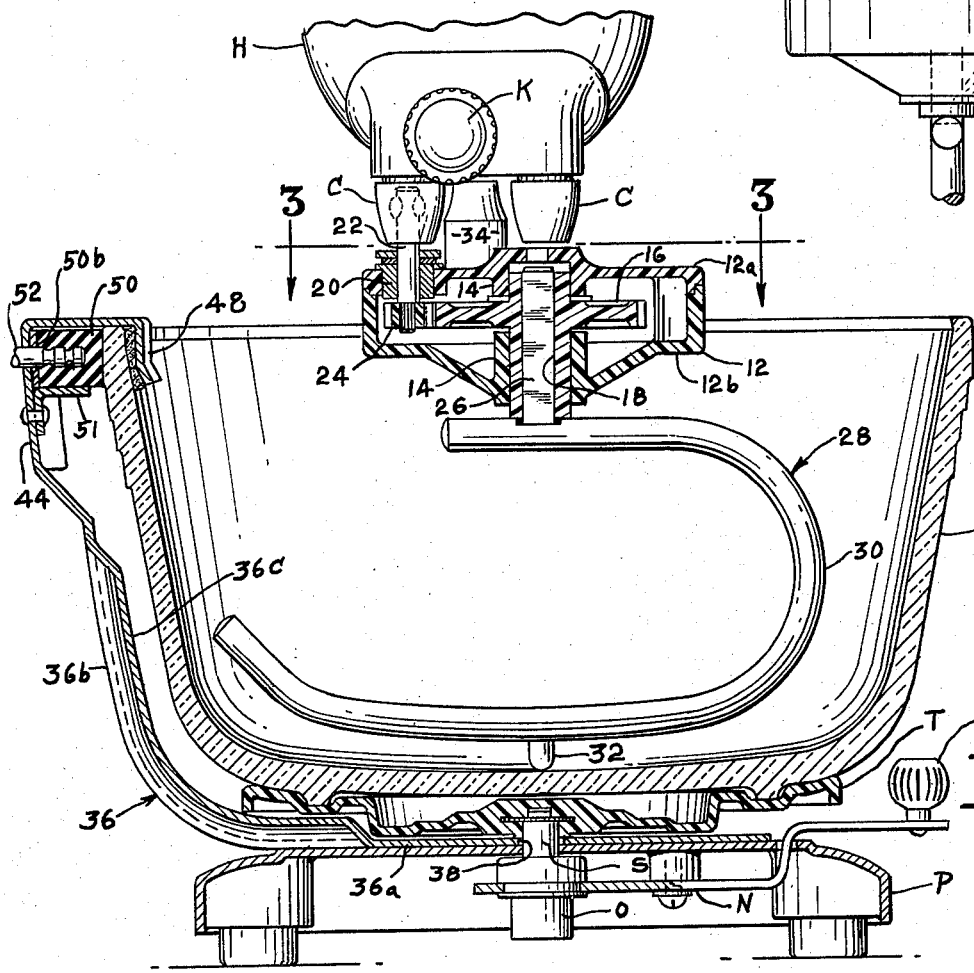

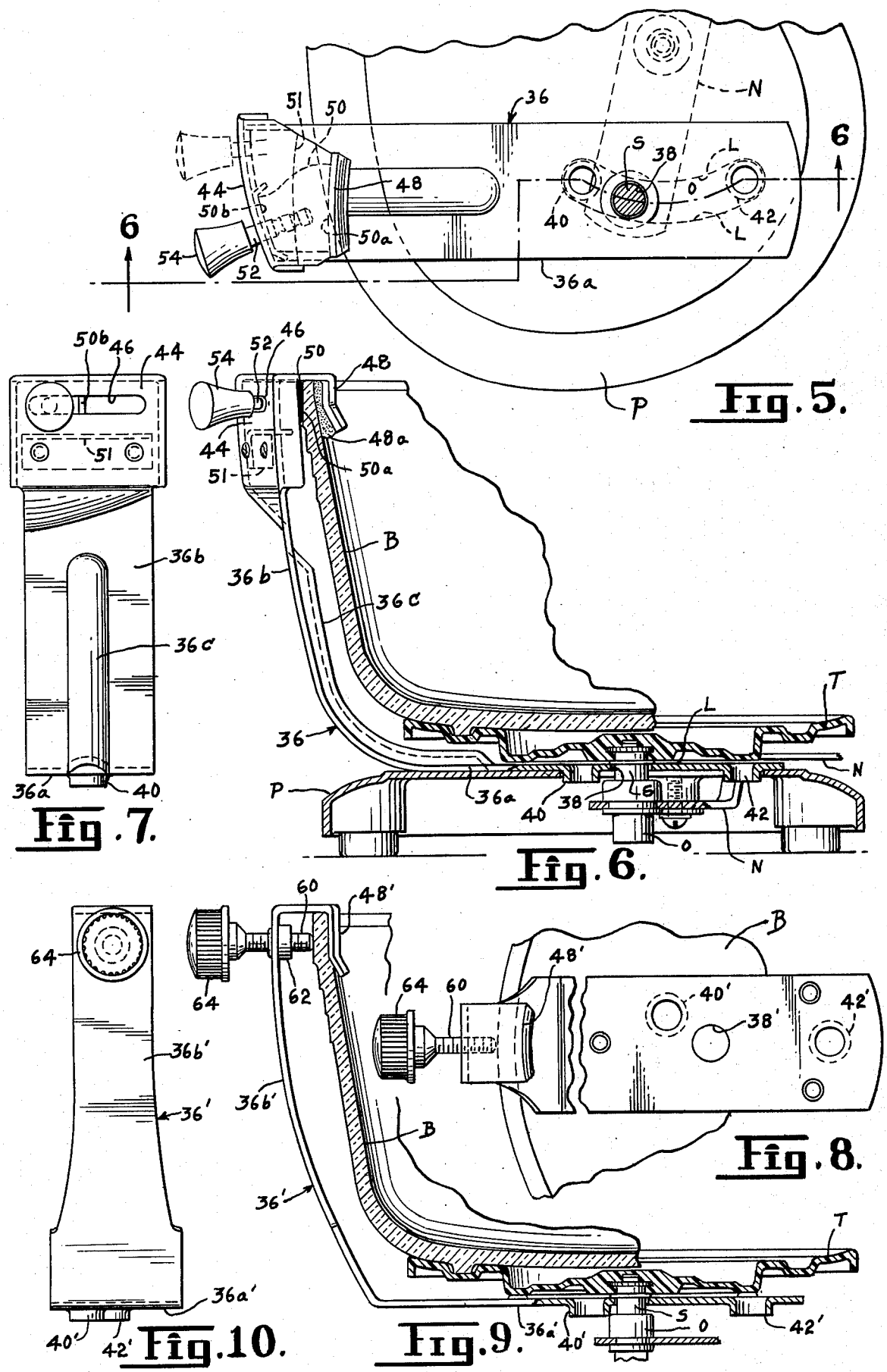

DOUGHMAKER ATTACHMENT FOR KITCHEN MIXER

BACKGROUND OF THE INVENTION

1. Field of the Invention

This invention relates to a doughmaker attachment for a mixer. More specifically, the invention relates to means by which the output of an electric kitchen mixer of the stand mixer variety may be reduced in speed, and dough hook means for use with the reduced speed output. The invention also includes means for immobilizing the bowl of such a mixer so that the dough hook will not turn the bowl or cause it to lift as the hook itself turns and works the dough.

2. Description of the Prior Art

In the prior art, there are a number of patents disclosing doughmakers and kneaders comprising a container and means, usually manually operated, for rotating the dough hook within the container. An example is shown in U.S. Pat. No. 2,946,299 to Clifford, granted July 26, 1960. Powered doughmakers are included in the prior art on heavy-duty commercial-type mixers, for example, as shown in the Kemper U.S. Pat. No. 3,749,373, issued July 31, 1973.

With respect to the conventional kitchen-type stand mixer, attempts have been made to re-configure the standard beater blades to present curled wire structures to be inserted in the conventional beater blade collets.

There has been no successful attempt in the past to provide means to convert a conventional mixer to drive a sturdy dough hook along with suitable means to immobilize the bowl as the hook works on the heavy, partly formed, dough in the mixer bowl.

SUMMARY OF THE INVENTION

The invention, therefore, includes speed-step-down means having a dough hook connected to its output shaft means and having its input adapted to be connected to the beater spindle of a conventional standard mixer. Means are provided to hold the mixer bowl from lifting and from turning as would otherwise be the case as the forceful hook works on the heavy dough within the bowl.

BRIEF DESCRIPTION OF THE DRAWINGS

Other features and objects of the invention will be apparent from a reading of the following specification and reference to the accompanying drawings, all of which describe and disclose a non-limiting embodiment of the invention.

In the drawings:

FIG. 1 is a side view with the bowl partly broken away of an embodiment of the invention attached to a standard mixer;

FIG. 2 is an enlarged sectional view taken across the center line of the bowl as indicated at line 2—2 of FIG. 1. The sectional representation of the speed-reducing housing for simplicity and ease of understanding is taken on the line 2—2 of FIG. 3;

FIG. 3 is a view taken on the sectional line 3—3 of FIG. 2 and showing the speed-reducing housing and showing the dough hook with one end shortened to save drawing space.

FIG. 3 is a side view of the speed-reducing housing used in accordance with the invention;

FIG. 5 is a fragmentary top view of the front end of the mixer pedestal with the bowl-supporting turntable removed and showing part of the bowl anti-rotation brake arm;

FIG. 6 is a sectional view taken on the line 6—6 of of FIG. 5 and including the bowl and turntable;

FIG. 7 is an end view of the bowl anti-rotation brake arm;

FIG. 8 is a top view similar to FIG. 5 showing a modified form of the bowl anti-rotation brake arm;

FIG. 9 is comparable to FIG. 6 but showing the modified form; and

FIG. 10 is comparable to FIG. 7 but showing the modified form.

DESCRIPTION OF THE PREFERRED EMBODIMENT

Referring more specifically to the drawings, FIG. 1 shows a more or less conventional mixer M of the type disclosed, for instance, in U.S. Pat. No. 2,891,745, issued June 23, 1959 to Seyfried et al and assigned to my assignee. It comprises a base or pedestal P, a rising column D hinged at I to permit upward tipping of the motor housing H. Beater collets C extend downward from the front of the housing H. Also provided is a beater assembly clamping knob K by which the beater assembly support rod is clamped into the housing. The mixer further includes a turntable T, and a spindle S rotatably mounted in a bearing O in the base P. The bearing O in turn is secured on a lever N, the position of which is controllable by a position knob Q. The pedestal is formed with an arcuate aperture L (FIG. 5) to accommodate the various positions of the bearing O as it is controlled. Supported on the turntable is the conventional bowl B.

Doughmaking apparatus in accordance with the invention is generally designated 10 in FIG. 1. It comprises a speed-reducing housing 12 having an upper half 12a bolted to a lower half 12b. The upper and lower halves present aligned bearing means 14 in which rotates a large gear 16 being preferably of plastic material (such as Delrin, an acetal) and having a square hole 18 on its axis. A bushing 20 is disposed in the upper half 12a of the housing and journals for rotation a shaft 22 appropriately keyed and received into the left-hand collet C in operative relation. The lower end of the shaft 22 carries a spur gear 24 which meshes with the large gear 16. The ratios of the diameters are such that the large gear 16 rotates slower than the output of the collet C.

Fitting operatively into the square hole 18 is the square stem 26 of the dough hook 28. The hook comprises a curved element 30 welded to the stem 26 so that it rotates about the axis of the shaft as a unit. Also on the axis is a downward stud 32 secured at the lower end of the hook to engage the bottom of the bowl B to hold it down on its turntable T.

Completing the dough-mixing assembly is an upward shank 34 preferably formed integral with the upper half housing 12a. The shank terminates upwardly in a reduced section of square cross section 34a (FIG. 3) which fits into the beater-assembly-support hole of the mixer housing H being clamped in position by the clamp knob K. The latter operation assures the support of the housing 12 and hook 30 in a firm manner, and as has been explained, the rotation of the collet C drives the shaft 22 which, through pinion 24 and gear 16, drives the stem 26 and hook 30.

While the stud 32 serves to hold the bowl B down, additional means required to immobilize the bowl comprise a rotation-blocking arm or anti-rotation brake 36. As best shown in FIG. 5, the lower portion 36a of the arm is horizontal and is provided with an opening 38 which receives the turntable spindle S. This arrangement in part fixes the position of the lower portion 36a. As shown in FIG. 5, the spindle S is adjustable along an arcuate aperture L in the mixer pedestal to normally control the position of the bowl relative to the mixer beaters. The exact firm positioning of the arm 36 is established by the provision of a pair of downward bosses 40, 42 on the undersurface of the lower portion 36a of the arm which fit into the extreme ends of the aperture L to fix the position of the arm 36 (FIG. 6). The turntable itself holds the portion 36a down with the bosses in the aperture.

As shown best in FIG. 6, the arm 36 is strengthened by having an inward rib 36c stamped therein to rigidify it. The upper end of the arm 36b is preferably formed with a front plate 44 which is integral with the arm. The plate is formed with a horizontal slot 46 and the arm extends further to bend over inward of the bowl and doubles back down in a section 48. The inner surface of section 48 is provided with a pad 48a.

Clamping means at the upper end of arm 36 comprises the rubber element 50 which has a facing surface 50a generally conforming with the shape of the bowl in that area. A support shelf 51 is secured to the inside of the plate 44 to support the element 50. The back surface 50b of the element rides on the inside of the plate 44 and is held in place by a knob stud 52 secured to the rubber element 50 and slideably in the slot 46. Knob 54 is secured to the outer end of the stud 52. By the means disclosed, the rim of the bowl B is placed under the strip 48 as shown in FIG. 6, with the rubber element 50 over to the left, as shown in FIG. 7. The element is then brought by the knob 54 rightwardly until it snugly engages the outside of the rim of the bowl. Because the facing surface 50a of the element is rubber, it stays in the clamping position until the knob 54 is again moved leftwardly (FIG. 7).

A modification of the clamping means is shown in FIGS. 8 through 10 wherein similar parts are designated by the primed form of the same reference numeral as used in the FIGS. 5 through 7 embodiment. The clamping means shown in the FIGS. 8 through 10 embodiment comprise a doubled-backed portion 48' of the arm 36 and a screw clamp bolt 60 interfitting with a nut 62 secured to the upper end of the arm 36'. The bolt 60 at its outward end has a thumb screw 64.

In use, the arm 36' of the FIGS. 8 through 10 embodiment is attached to the pedestal P in the same way as the FIGS. 5 through 7 embodiment with the spindle S of the turntable T fitting through the opening 38' on its way to the bearing O. The bosses 40', 42' fit into the opposite ends of the slot L (FIG. 5) as with the earlier embodiment and the turntable T holds the lower portion of the arm 36 downward. In placing the bowl B on the turntable T, the bowl is maneuvered so that its rim is under the doubled-back portion 48' and the thumb screw 64 is then tightened to secure the bowl B from rotation. Because the arm 36' will not rotate, and the top of the arm is secured to the bowl B, the bowl is indeed immobilized.

As explained, the stud 32 (FIG. 2) complements the arm 36 by holding the bowl B downward against its tendency to rise.

The operation of the structure embodying the invention should now be apparent to one skilled in the art.

The bowl B is installed with the arm 36 in place and the braking or clamping means 50 or 60 tightened. Then, with the housing H pivoted up about the pivot point I, the shaft 22 is operatively engaged into the left-hand collet C (FIG. 2). At the same time, the upper end 34a of the shank 34 on the housing is inserted into the hole in the housing and the clamping knob K is closed tightly thereagainst. This places the apparatus 10 in its proper position. The stem 26 of the hook 30 is inserted into the opening 18 in the large gear 16. The motor is then pivoted back down around pin I to its normal position, as shown in FIG. 1, the stud 32 engaging the bowl B to hold it down.

Procedure for actually making dough will not be detailed here. It is customary, however, to fill the bowl B with a portion of the dry ingredients including flour, yeast, and salt and to then activate the motor in the housing H so that hook 28 rotates about the axis of the stem 26 in slow speed. Subsequently, milk, oil, and other liquid ingredients are added as are additional dry ingredients, while the hook is working. After all the ingredients are together, and after sufficient mixing time, the contents of the bowl B is a stiff dough which may then be scraped out onto a working board and shaped as desired.

The present invention thus takes a usual kitchen stand mixer and turns it into a dough-making machine having a hook with sufficient force and bowl immobilizing means of sufficient strength as to mix dough. The simplicity of the invention will be recognized and appreciated by those skilled in the art.

While the invention has been claimed in only one form, it is not so limited and may be expressed in the following claim language.

I claim:
1. A rugged doughmaker attachment for a conventional electric mixer having a base with a turntable having a central shaft, the turntable supporting a mixing bowl, the base having an upward column mounting a motor casing, the motor casing having in its underside above the bowl a pair of downward beater-receiving chucks and an upward opening with clamp means for holding the beater-assembly-support of the mixer, the attachment comprising:
   a. a sturdy dough hook assembly comprising:
      1. a housing having an upward stem adapted to be clamped into the opening to support the housing in a stationary manner;
      2. a speed-reducing gear train in the housing having an input shaft operatively engageable with one of the chucks and a downward output shaft disposed centrally of the housing;
      3. a dough hook integral with the lower end of the output shaft and adapted to operate in the bowl; and
   b. means for immobilizing the bowl including:
      1. a downward stud integral with and depending from the lowermost part of the dough hook substantially at the vertical axis of rotation thereof, the stud adapted to engage the bowl bottom to keep the bowl down, and
      2. arm means braking rotation of the bowl, the arm means having an aperture in the lower portion thereof, the aperture receiving the shaft of the turntable thereby at least partly immobilizing the arm means, the arm means extending upward to a point adjacent the rim of the bowl and bowl-rim-gripping means at the point securing the top of the arm to the bowl adjacent the rim thereof.

2. A rugged doughmaker attachment as claimed in claim 1 wherein the bowl-rim-gripping means includes inverted U-shaped means adapted to hook over the rim of the bowl and threaded bolt means screwed into a threaded aperture at one leg of the inverted U-shaped means adapted to clamp the bowl rim against the other leg.

3. A rugged doughmaker attachment as claimed in claim 1 wherein the arm is formed adjacent its lower end with a pair of downward bosses and the base is apertured and receives said bosses to further secure the arm to the base.

* * * * *